(12) United States Patent
Zhu et al.

(10) Patent No.: US 9,941,687 B2
(45) Date of Patent: Apr. 10, 2018

(54) METHODS FOR OPERATING WIND TURBINE SYSTEM HAVING DYNAMIC BRAKE

(71) Applicant: General Electric Company, Schenectady, NY (US)

(72) Inventors: Huibin Zhu, Schenectady, NY (US); Xueqin Wu, Shanghai (CN); Shouzhong Chang, Shanghai (CN); Jie Ding, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/892,077

(22) PCT Filed: Jun. 4, 2013

(86) PCT No.: PCT/CN2013/076688
§ 371 (c)(1),
(2) Date: Nov. 18, 2015

(87) PCT Pub. No.: WO2014/194464
PCT Pub. Date: Dec. 11, 2014

(65) Prior Publication Data
US 2016/0118786 A1 Apr. 28, 2016

(51) Int. Cl.
*F03D 9/00* (2016.01)
*H02H 7/06* (2006.01)
(Continued)

(52) U.S. Cl.
CPC .......... *H02H 7/067* (2013.01); *F03D 1/0675* (2013.01); *F03D 7/0224* (2013.01);
(Continued)

(58) Field of Classification Search
CPC .... F03D 7/0244; F03D 7/0272; F03D 7/0284; F03D 9/003; F03D 9/005; H02J 3/386; H20P 9/10
(Continued)

(56) References Cited

U.S. PATENT DOCUMENTS 4,352,049 A    9/1982   Franz
6,281,596 B1    8/2001   Gilbreth et al.
(Continued)

FOREIGN PATENT DOCUMENTS

CN      1820142 A    8/2006
CN    102005779 A    4/2011
(Continued)

OTHER PUBLICATIONS

General Electric Co., International Patent Application PCT/CN2013/076688; International Search Report dated Mar. 13, 2014 (5 pages).
(Continued)

*Primary Examiner* — Julio C. Gonzalez
(74) *Attorney, Agent, or Firm* — Dority & Manning, P.A.

(57) ABSTRACT

Methods for operating a wind turbine system are provided. In one embodiment, a method includes adjusting a threshold direct current (DC) bus voltage for a dynamic brake in a wind turbine power converter above a reference DC bus voltage based on at least one system condition. The method further includes gating the dynamic brake on when an experienced DC bus voltage is equal to or greater than the threshold DC bus voltage, and inputting a dynamic brake condition into a controller when the dynamic brake is gated on. The method further includes determining if a grid fault has occurred, reducing power generation of the wind turbine if no grid fault has occurred, and blocking the power converter if a grid fault has occurred. The method further (Continued)

includes gating the dynamic brake off when the experienced DC bus voltage is less than the threshold DC bus voltage.

20 Claims, 6 Drawing Sheets

(51) Int. Cl.
- F03D 7/02 (2006.01)
- H02P 9/00 (2006.01)
- H02P 9/10 (2006.01)
- H02J 3/38 (2006.01)
- F03D 1/06 (2006.01)
- F03D 7/04 (2006.01)
- F03D 9/25 (2016.01)

(52) U.S. Cl.
CPC ......... *F03D 7/0244* (2013.01); *F03D 7/0272* (2013.01); *F03D 7/0284* (2013.01); *F03D 7/042* (2013.01); *F03D 9/255* (2017.02); *F03D 9/257* (2017.02); *H02J 3/386* (2013.01); *H02P 9/007* (2013.01); *H02P 9/10* (2013.01); *F05B 2260/903* (2013.01); *Y02E 10/721* (2013.01); *Y02E 10/723* (2013.01); *Y02E 10/725* (2013.01); *Y02E 10/763* (2013.01)

(58) Field of Classification Search
USPC ......... 290/44, 55; 700/286, 287, 288; 415/1; 416/1
See application file for complete search history.

(56) References Cited

U.S. PATENT DOCUMENTS

| | | | |
|---|---|---|---|
| 6,577,483 B1* | 6/2003 | Steicher | H02P 3/18 318/370 |
| 7,102,247 B2 | 9/2006 | Feddersen | |
| 7,164,562 B2 | 1/2007 | Virtanen | |
| 7,332,827 B2 | 2/2008 | Nielsen et al. | |
| 7,518,256 B2 | 4/2009 | Juanarena et al. | |
| 7,834,472 B2* | 11/2010 | Rebsdorf | F03D 7/0284 290/44 |
| 7,859,125 B2 | 12/2010 | Nielsen et al. | |
| 7,939,954 B2 | 5/2011 | Ruiz et al. | |
| 8,093,741 B2 | 1/2012 | Ritter et al. | |
| 8,093,742 B2 | 1/2012 | Gupta et al. | |
| 8,432,055 B2 | 4/2013 | Grbovic | |
| 8,970,057 B2 | 3/2015 | Li et al. | |
| 2007/0279815 A1* | 12/2007 | Li | F03D 7/0248 361/54 |
| 2009/0008937 A1 | 1/2009 | Erdman et al. | |
| 2009/0261589 A1 | 10/2009 | Oohara et al. | |
| 2009/0278352 A1 | 11/2009 | Rivas et al. | |
| 2011/0140430 A1* | 6/2011 | Ritter | H02J 3/386 290/44 |
| 2011/0215772 A1 | 9/2011 | Sheng et al. | |
| 2012/0133343 A1* | 5/2012 | Grbovic | F03D 9/003 322/21 |
| 2013/0207394 A1* | 8/2013 | Banham-Hall | F03D 7/0224 290/44 |
| 2015/0077067 A1* | 3/2015 | Kanjiya | H02H 7/067 322/21 |
| 2015/0229257 A1* | 8/2015 | Lu | F03D 7/0224 322/21 |

FOREIGN PATENT DOCUMENTS

| | | |
|---|---|---|
| CN | 102187567 A | 9/2011 |
| CN | 102545759 A | 7/2012 |
| CN | 102834996 A | 12/2012 |
| GB | 2419968 A | 5/2006 |
| WO | WO2005/015012 A1 | 2/2005 |
| WO | WO2010045964 | 4/2010 |
| WO | WO2011/160643 A2 | 12/2011 |
| WO | WO2012/134458 A1 | 10/2012 |
| WO | WO2014194464 A1 | 12/2014 |

OTHER PUBLICATIONS

European Search Report and Opinion issued in connection with corresponding EP Application No. 13886596.9 dated Jan. 30, 2017.

\* cited by examiner

METHODS FOR OPERATING WIND TURBINE SYSTEM HAVING DYNAMIC BRAKE

FIELD OF THE INVENTION

The present disclosure relates generally to wind turbines, and more particularly to methods for operating such wind turbines and in particular dynamic braking of such systems.

BACKGROUND OF THE INVENTION

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

A typical DFIG system includes a two-winding transformer having a high voltage primary (e.g. greater than 12 KVAC) and a low voltage secondary (e.g. 575 VAC, 690 VAC, etc.) to couple the DFIG system to the electrical grid. The high voltage primary can be coupled to the high voltage electrical grid. The stator bus providing AC power from the stator of the DFIG and the line bus providing AC power from the power converter can be coupled to the low voltage secondary. In this system, the output power of the stator and the output power of the power converter are operated at the same voltage and combined into the single transformer secondary winding at the low voltage.

More recently, DFIG systems have included a three winding transformer to couple the DFIG system to the electrical grid. The three winding transformer can have a high voltage (e.g. greater than 12 KVAC) primary winding coupled to the electrical grid, a medium voltage (e.g. 6 KVAC) secondary winding coupled to the stator bus, and a low voltage (e.g. 575 VAC, 690 VAC, etc.) auxiliary winding coupled to the line bus. The three winding transformer arrangement can be preferred in increased output power systems (e.g. 3 MW systems) as it reduces the current in the stator bus and other components on the stator side of the DFIG.

During operation of wind turbine systems, including DFIG systems, various grid faults can occur, which result in a disconnect between generation of power by the wind turbine and receipt of that power by the grid. This can result in excessive energy in the power converter, which can cause damage to the converter.

Various approaches have been utilized to reduce the risk of overvoltage conditions in power converters. For example, crowbars have been utilized to prevent excess energy from reaching the power converter when grid faults occur. More recently, dynamic brake systems have been utilized. Conventional dynamic brake systems include a resistor in series with a switch, such as an insulated-gate bipolar transistor (IGBT), and absorb excess energy in the converter when gated on during when a grid fault occurs.

However, conventional dynamic brake systems are not without drawbacks. For example, when a dynamic brake is gated on, the line side of the power converter is not protected from excess energy. This excess line side energy can be transmitted through, and damage, the line side of the converter. Further, in some cases during operation of dynamic brakes, a dynamic brake may be gated off due to increased temperature conditions before sufficient energy has been absorbed, thus again risking damage to the power converter.

Accordingly, improved methods for operating wind turbine systems are desired. In particular, improved methods which utilize dynamic brakes and provide reduced risk of power converter damage would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a method for operating a wind turbine system. The method includes adjusting a threshold direct current (DC) bus voltage for a dynamic brake in a wind turbine power converter above a reference DC bus voltage based on at least one system condition. The method further includes gating the dynamic brake on when an experienced DC bus voltage is equal to or greater than the threshold DC bus voltage, and inputting a dynamic brake condition into a controller when the dynamic brake is gated on. The method further includes determining if a grid fault has occurred, reducing power generation of the wind turbine if no grid fault has occurred, and blocking the power converter if a grid fault has occurred. The method further includes gating the dynamic brake off when the experienced DC bus voltage is less than the threshold DC bus voltage.

In another embodiment, the present disclosure is directed to a method for operating a wind turbine system. The method includes inputting a dynamic brake condition into a controller when a dynamic brake of a wind turbine power converter is gated on. The method further includes determining if a grid fault has occurred, reducing power generation of the wind turbine if no grid fault has occurred, and blocking the power converter if a grid fault has occurred.

In another embodiment, the present disclosure is directed to a method for operating a wind turbine system. The method includes monitoring a threshold direct current (DC) bus voltage for a dynamic brake in a wind turbine power converter, and adjusting the threshold DC bus voltage above a reference DC bus voltage based on at least one system condition. The method further includes gating the dynamic brake on when an experienced DC bus voltage is equal to or greater than the threshold DC bus voltage, and gating the dynamic brake off when the experienced DC bus voltage is less than the threshold DC bus voltage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
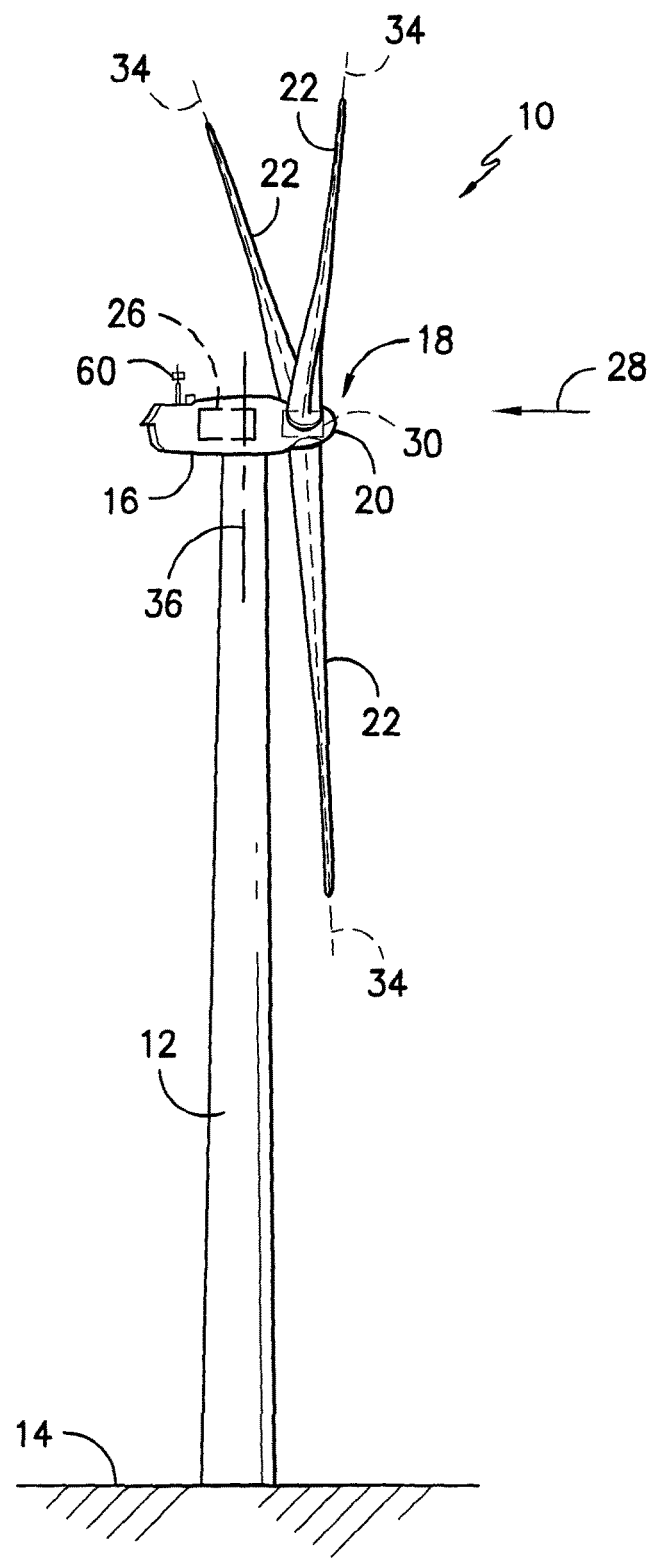
FIG. 1 is a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Still further, the turbine controller 26 may be configured to control the torque of the generator 24. For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

Figure 3:
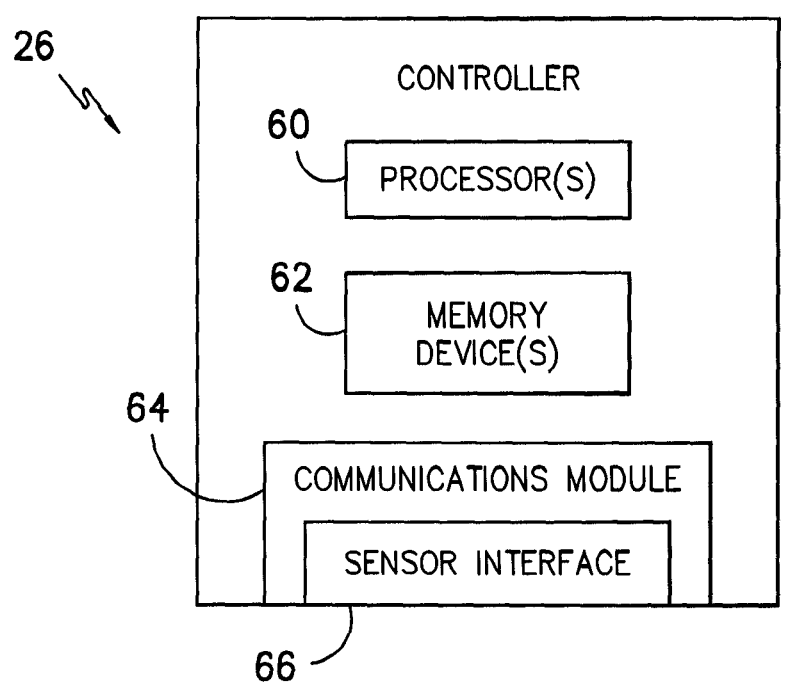
FIG. 3 illustrates a schematic diagram of one embodiment of suitable components that may be included within a controller of a wind turbine.

It should be appreciated that the turbine controller 26 may generally comprise a computer or any other suitable processing unit. Thus, in several embodiments, the turbine controller 26 may include one or more processor(s) and associated memory device(s) configured to perform a variety of computer-implemented functions, as shown in FIG. 3 and discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

Figure 2:
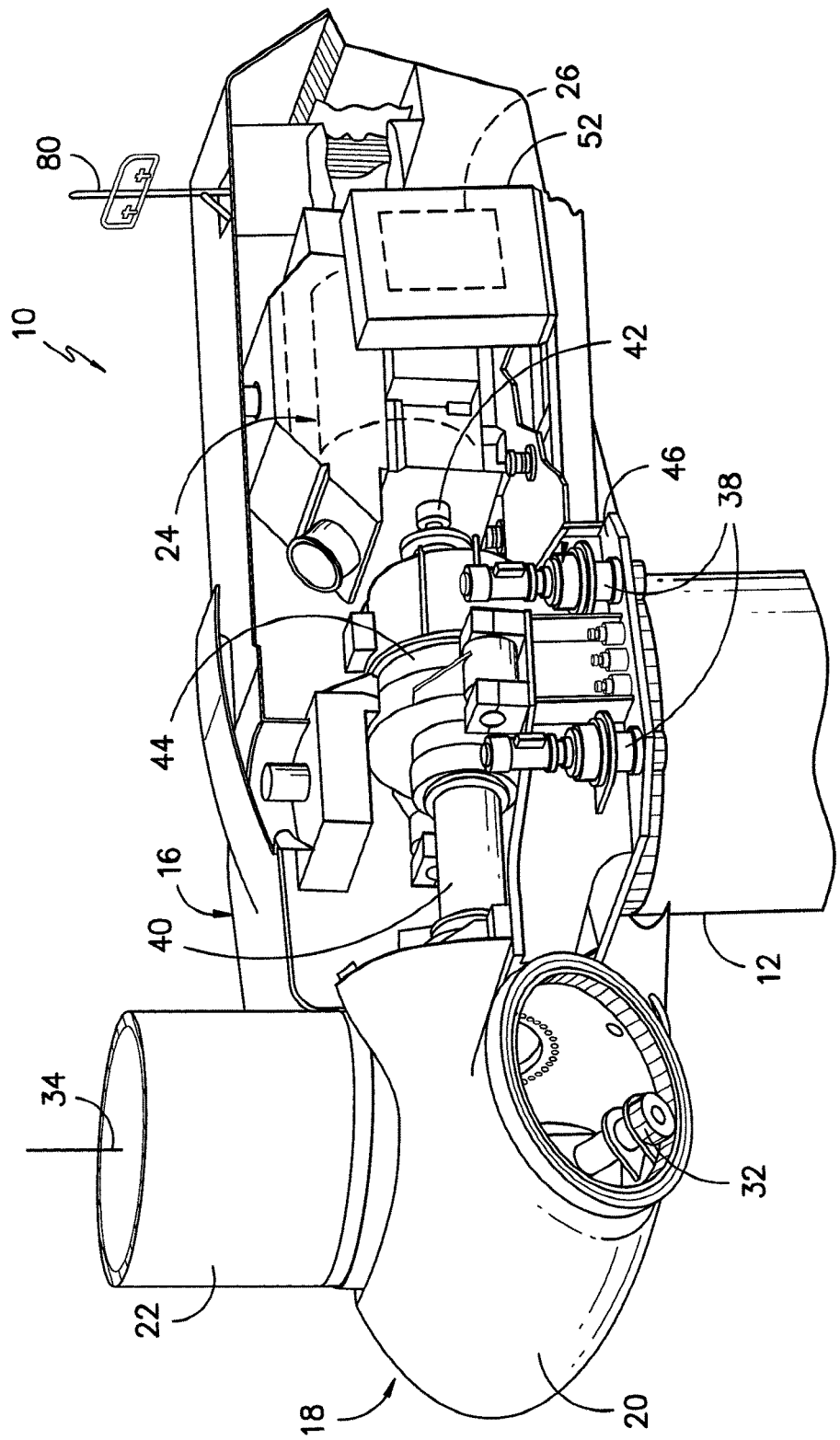
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks 48, 50 mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

The present disclosure is further directed to methods for operating wind turbines 10. In particular, controller 26 may be utilized to perform such methods, and may further control torque adjustment of the generator 24, yaw adjustment of the wind turbine 10, and/or pitch adjustment of the rotor blades 22 based on such methods as discussed herein. Referring now to FIG. 3, there is illustrated a block diagram of one embodiment of suitable components that may be included within the turbine controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensor, to be converted into signals that can be understood and processed by the processors 60.

Figure 4:
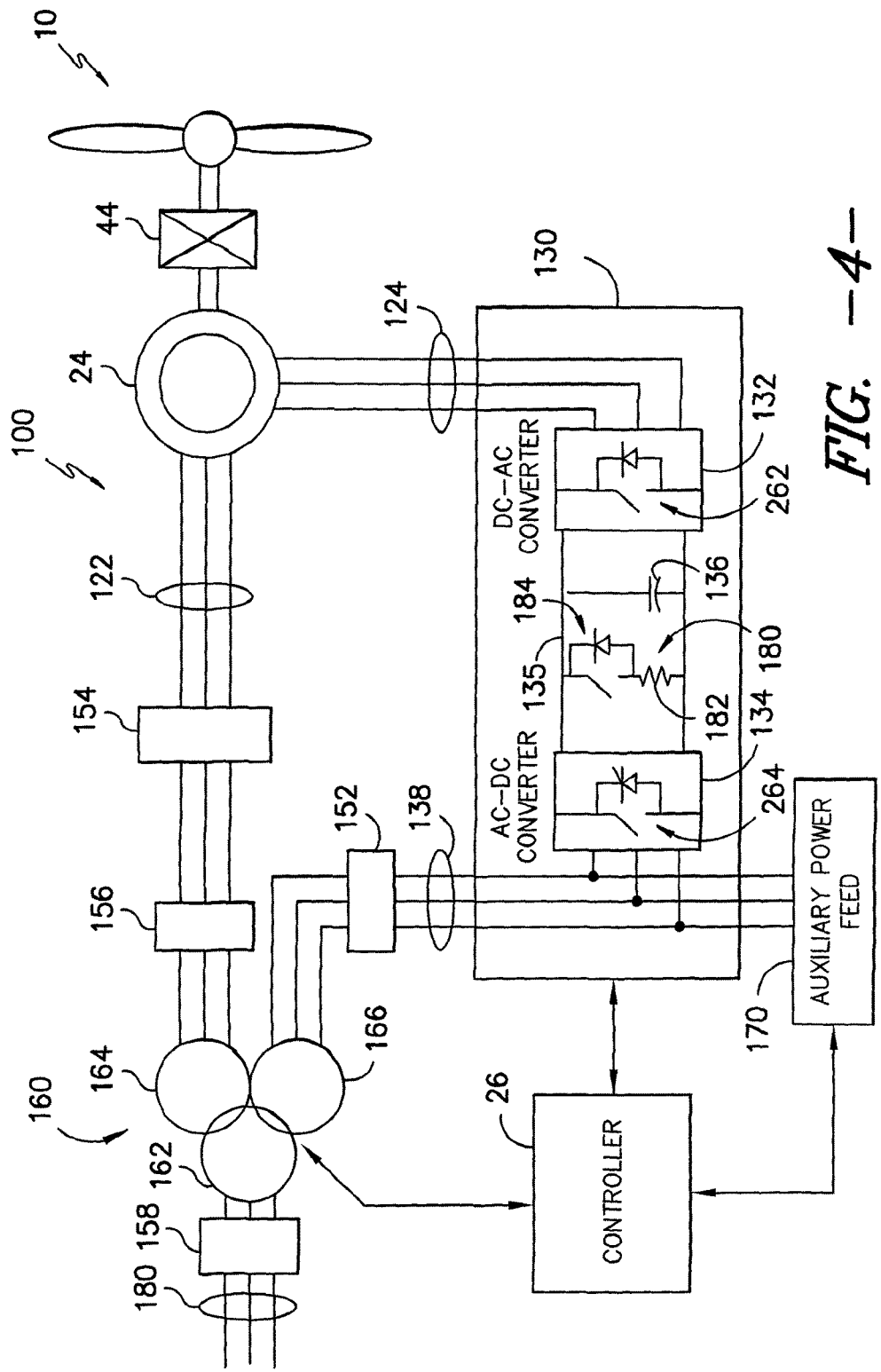
FIG. 4 illustrates a DFIG wind turbine system according to one embodiment of the present disclosure.

FIG. 4 depicts an exemplary doubly-fed induction generator (DFIG) wind turbine system 100 according to an exemplary embodiment of the present disclosure. In the exemplary system 100, wind turbine 10 includes, as discussed above, an optional gear box 44, which is, in turn, coupled to a generator 24. In accordance with aspects of the present disclosure, the generator 24 is a doubly fed induction generator (DFIG) 24. It should be understood, however, that the present disclosure is not limited to DFIG systems 100 and DFIGs 24, and rather that any suitable wind turbine system and generator, including for example full power conversion systems and generators, is within the scope and spirit of the present disclosure.

DFIG 24 is typically coupled to a stator bus 122 and a power converter 130 via a rotor bus 124. The stator bus 122 provides an output multiphase power (e.g. three-phase power) from a stator of DFIG 24 and the rotor bus 124 provides an output multiphase power (e.g. three-phase power) of the rotor of DFIG 24. Referring to the power converter 130, DFIG 24 is coupled via the rotor bus 124 to a rotor side converter 132. The rotor side converter 132 is coupled to a line side converter 134 which in turn is coupled to a line side bus 138.

In exemplary configurations, the rotor side converter 132 and the line side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor side converter 132 and the line side converter 134 can be coupled via a DC link 135 across which is the DC link capacitor 136.

The power converter 130 can be coupled to controller 26 to control the operation of the rotor side converter 132 and the line side converter 134. For instance, the controller 26 can send control commands to the rotor side converter 132 and line side converter 134 to control the modulation of switching elements (such as IGBTs) used in the power converter 130 to provide a desired real and reactive power output.

As illustrated, the system 100 includes a transformer 160 coupling the wind turbine system 100 to an electrical grid 180. The transformer 160 of FIG. 4 is a three-winding transformer that includes a high voltage (e.g. greater than 12 KVAC) primary winding 162 coupled to the electrical grid, a medium voltage (e.g. 6 KVAC) secondary winding 164 coupled to the stator bus 122, and a low voltage (e.g. 575 VAC, 690 VAC, etc.) auxiliary winding 166 coupled to the line bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

An auxiliary power feed 170 is coupled to the output of the power converter 130. The auxiliary power feed 170 acts as a power source for various components of the wind turbine system 100. For instance, the auxiliary power feed 170 can power fans, pumps, motors, and other suitable components of the wind turbine system 100.

In operation, power generated at DFIG 24 by rotating the rotor 106 is provided via a dual path to electrical grid 180. The dual paths are defined by the stator bus 122 and the rotor bus 124. On the rotor bus 124 side, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line side converter 134 converts the DC power on the DC link 135 into AC power at a frequency suitable for the electrical grid 180. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 180.

The power converter 130 can receive control signals from, for instance, the controller 26. The control signals can be based, among other things, on sensed conditions or operating characteristics of the wind turbine system 100. For instance, the control signals can be based on sensed voltage associated with the transformer 160 as determined by a voltage sensor 144. As another example, the control signals can be based on sensed voltage associated with the auxiliary power feed 170 as determined by a voltage sensor 146.

Typically, the control signals provide for control of the operation of the power converter 130. For example, feedback in the form of sensed speed of the DFIG 24 can be used to control the conversion of the output power from the rotor bus 156 to maintain a proper and balanced multi-phase (e.g. three-phase) power supply. Other feedback from other sensors can also be used by the controller 26 to control the power converter 130, including, for example, stator and rotor bus voltages and current feedbacks. Using the various forms of feedback information, switching control signals (e.g. gate timing commands for IGBTs), stator synchronizing control signals, and circuit breaker signals can be generated.

On the stator bus 122 side, sinusoidal multi-phase (e.g. three-phase) alternating current (AC) power is provided from the stator of the generator 120 to the stator bus 122, and from the stator bus 122 to the transformer 160, and in particular to the secondary winding 164 thereof. Various circuit breakers, fuses, contactors, and other devices, such as grid circuit breaker 158, stator bus circuit breaker 156, switch 154, and line bus circuit breaker 152, can be included in the system 100 to connect or disconnect corresponding buses, for example, when current flow is excessive and can damage components of the wind turbine system 100 or for other operational considerations. Additional protection components can also be included in the wind turbine system 100.

Referring still to FIG. 4, a dynamic brake 180 may be provided in the power converter 130 between the rotor side converter 132 and the line side converter 134. The dynamic brake 180, when gated on, absorbs energy in the converter 130. For example, in exemplary embodiments as shown, a dynamic brake 180 may include a resistor 182 in series with a switch 184, which may for example be an IGBT.

Figure 5:
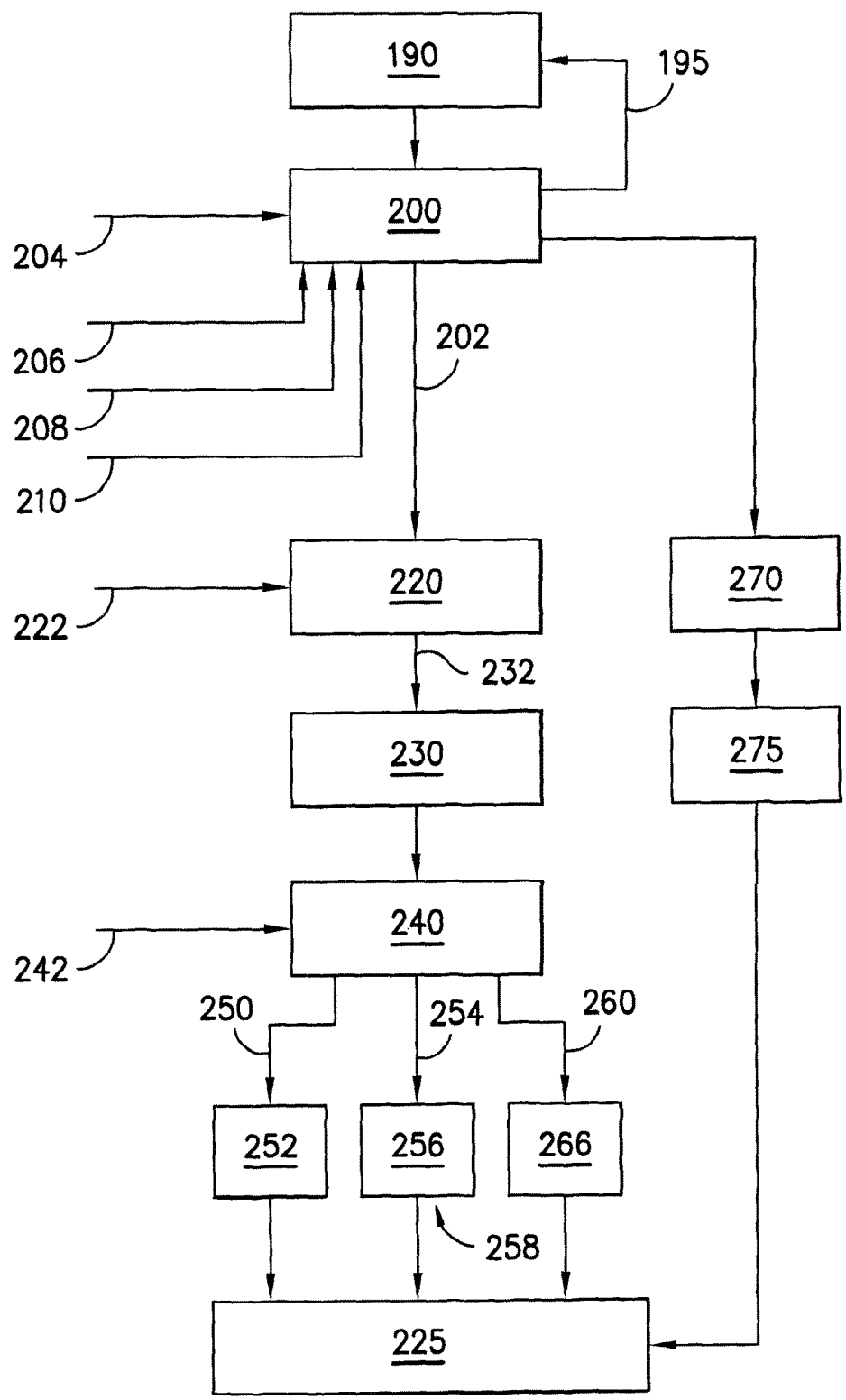
FIG. 5 is a flow chart illustrating a method according to one embodiment of the present disclosure.
Figure 6:
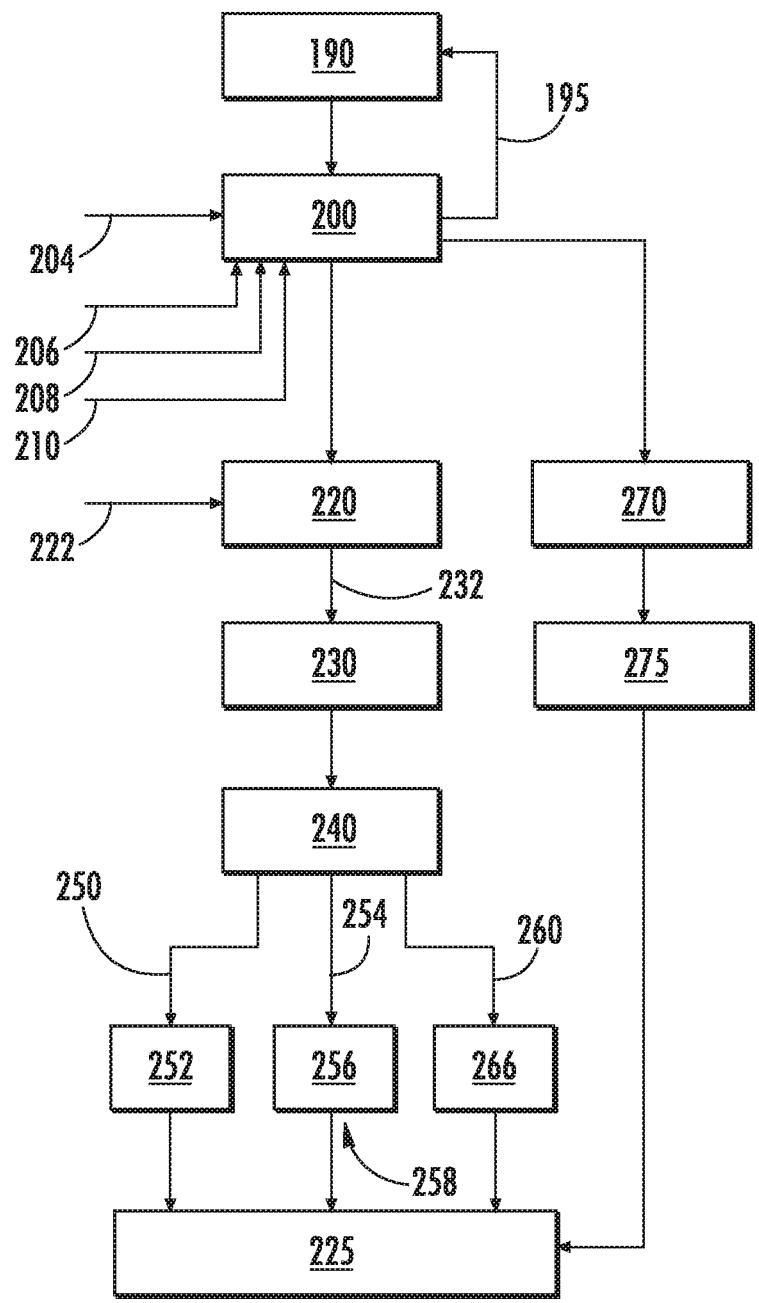
FIG. 6 is a flow chart illustrating a method according to one embodiment of the present disclosure.

Referring now to FIG. 4 as well as FIG. 5, the present disclosure is further directed to methods for operating wind turbine systems 100, particularly through advantageous use of the dynamic brake 180. Such methods may include, for example, the step 190 of monitoring a threshold direct current (DC) bus voltage 202 for the dynamic brake 180. DC bus voltage is generally the voltage over the DC link 135. The threshold DC bus voltage 202 is thus a threshold voltage for the dynamic brake 180, such that gating on occurs when the threshold DC bus voltage 202 is met or exceeded. Monitoring may, for example, be performed through the use of suitable sensors in or around the converter 130 in general and/or through interaction with the controller 26, such as through the receipt of suitable monitoring signals by the controller 26 from the converter 130.

Such methods may further include, for example, the step 200 of adjusting a threshold direct current (DC) bus voltage 202 for the dynamic brake 180 above a reference DC bus voltage 204. The reference DC bus voltage 204 is generally the rated voltage for the dynamic brake 180. The adjustment of the threshold voltage 202 to above this reference voltage 204 may generally be based on one or more system conditions. Such system conditions may include any one or more of, for example, an alternating current (AC) grid voltage 206 entering the power converter 130, such as through the rotor side converter 132; an AC voltage drop 208 through the power converter 130; and a load current 210 through the power converter 130. In some exemplary embodiments, the threshold DC bus voltage 202 may be calculated by multiplying the AC grid voltage 206 times the AC voltage drop 208, and adding this result to the load current 210. The threshold DC bus voltage 202 may be a factor or multiple of this result. Adjustment of the threshold DC bus voltage 202 may, for example, be performed by the controller 26 based on monitoring of the threshold DC bus voltage 202 and receipt of the system conditions.

In some exemplary embodiments, the monitoring step 190 and the adjusting step 200 are performed in a closed loop feedback system, as indicated by reference numeral 195, and which may be facilitated through the controller 26. Such closed loop feedback system allows for the threshold DC bus voltage 202 to be constantly or intermittently adjusted as desired or required during system operation.

The use of a dynamic threshold DC bus voltage provides significant advantages over the conventional use of a static threshold DC bus voltage typically equal to the reference DC bus voltage. For example, such dynamic threshold provides greater converter 130 efficiency and increased converter 130 component utilization.

Methods according to the present disclosure may further include, for example, the step 220 of gating the dynamic brake 180 on when an experienced DC bus voltage 222 is equal to or greater than the threshold DC bus voltage 202. The experienced DC bus voltage 222 is generally the DC bus voltage 222 actually experienced by the converter 130 during operation of the system 100. Methods according to the present disclosure may further include, for example, the step 225 of gating the dynamic brake off when the experienced DC bus voltage 222 is less than the threshold DC bus voltage 202.

Methods according to the present disclosure may further include, for example, the step 230 of inputting a dynamic brake condition 232 into the controller 26 when the dynamic brake 180 is gated on. The dynamic brake condition 232 is generally a suitable signal, sent to the controller 26, that the dynamic brake 180 has been gated on.

Methods according to the present disclosure may further include, for example, the step 240 of determining if a grid fault 242 has occurred. A grid fault 242 according to the present disclosure is generally any disruption to the operation of the system 100 other than the threshold DC bus voltage 202 being exceeded. For example, a grid fault 242 may be an open grid islanding event, a phase jump event, a high voltage ride through event, a low voltage ride through event, a zero voltage ride through event, or any other suitable disruption to the system 100 (other than the threshold DC bus voltage 202 being exceeded). Such determination is typically performed by the controller 26 through receipt, or lack thereof, of signals reporting a grid fault 242.

By determining whether a grid fault 242 has occurred when the dynamic brake is gated on in step 240, the system 100 may advantageously respond in a manner most appropriate for the current condition of the system 100. For example, methods according to the present disclosure may include, for example, the step 250 of reducing power generation of the wind turbine 10 if no grid fault 242 has occurred. Thus, if no grid fault 242 has occurred, the controller 26 may send suitable signals to components of the wind turbine 10, instructing those components to suitably adjust the wind turbine 10 power generation. For example, in some embodiments, the step 250 of reducing power generation may include the step 252 of pitching at least one rotor blade 22 of the wind turbine 10. Additionally or alternatively, the step 250 of reducing power generation may include the step of adjusting the yaw of the wind turbine 10. For example, the controller 26 may be in communication with the yaw drive mechanism 32, as discussed above, to adjust the yaw of the wind turbine 10. Additionally or alternatively, the step 250 of reducing power generation may include the step of adjusting the torque of the generator 24. For example, the controller 26 may be in communication with the generator 24, as discussed above, to adjust the torque thereof.

Further, if no grid fault 242 has occurred, the controller 26 may send suitable signals to other wind turbines 256 in a wind farm 258 that includes the wind turbine 10 and system 100. Additional wind turbines 256 may be similar to wind turbine 10 as discussed above, and may be included in systems similar to system 100 as discussed above. A wind farm 248 may include a plurality of wind turbines 10, 256. Thus, methods according to the present disclosure may include, for example, the step 254 of reducing power generation at least one other wind turbine 256 in the wind farm 258 if no grid fault 242 has occurred.

Alternatively, however, a grid fault 242 may have occurred. Thus, methods according to the present disclosure may include, for example, the step 260 of blocking the power converter 130 if a grid fault 242 has occurred. Thus, if a grid fault 242 has occurred, the controller 26 may send suitable signals to components of the system 100 to disrupt operation of the power converter 130. For example, as shown in FIG. 4, the power converter 130 may include one or more rotor side switches 262, which may be components of the rotor side converter 132, and one or more line side switches 264, which may be components of the line side converter 134. The switches 262, 264 in exemplary embodiments may be IGBTs. Referring again to FIG. 5, in some embodiments, blocking the power converter 130 may include the step 266 of gating off one or more of the rotor side switches 262 or the line side switches 264.

Methods according to the present disclosure may further include, for example, the step 270 of monitoring at least one current through or temperature of at least one of the following when the dynamic brake 180 is gated on: the rotor side switch 262, the line side switch 264, the dynamic brake switch 184, and/or the dynamic brake resistor 182. Such monitoring may occur, for example, through the use of sensors or microsensors on the various switches 262, 264, 184 and resistor 182, or through the use of suitable signals provided to the controller 26, or through use of any other suitable methods or apparatus. Methods according to the present disclosure may further include, for example, the step 275 of gating off the one or more of the switches 262, 264, 184 and/or resistor 182 when the current or temperature thereof exceeds a predetermined threshold. The predetermined threshold may be a rated current or temperature for that particular switches 262, 264, 184 or resistor 182. Additional monitoring of these switches 262, 264, 184 and resistor 182 provide further safeguards to the system 100 during operation, particularly when the dynamic brake 180 is gated on.

It should additionally be noted that in some embodiments, the various switches, circuit breakers, fuses, contactors, etc. utilized according to the present disclosure may have ratings approximately equal to the overall system requirements. Alternatively, however, in some embodiments, one or more such switches, circuit breakers, fuses, contactors, etc. may have ratings substantially higher than the overall system requirements. For example, for a 690 VAC system, 690 VAC or 700 VAC ratings may be utilized in some embodiments, while in other embodiments, 1200 VAC ratings may be utilized. Such higher ratings, which may for example, be between approximately 1.5 and approximately 2 times the system requirements or more, may advantageously reduce damage in the case of grid faults, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine system, the method comprising:

adjusting a threshold direct current (DC) bus voltage for a dynamic brake in a wind turbine power converter above a reference DC bus voltage based on at least one system condition;

gating the dynamic brake on when an experienced DC bus voltage is equal to or greater than the threshold DC bus voltage;

inputting a dynamic brake condition into a controller when the dynamic brake is gated on;
determining when a grid fault has occurred when the dynamic brake is gated on;
reducing power generation of the wind turbine when no grid fault has occurred;
blocking the power converter when a grid fault has occurred; and
gating the dynamic brake off when the experienced DC bus voltage is less than the threshold DC bus voltage.

2. The method of claim 1, wherein the step of reducing power generation comprises pitching at least one rotor blade of the wind turbine.

3. The method of claim 1, wherein the step of blocking the power converter comprises gating off at least one of a line side switch or a rotor side switch.

4. The method of claim 1, wherein the grid fault comprises at least one of an open grid islanding event, a phase jump event, a high voltage ride through event, a low voltage ride through event, or a zero voltage ride through event.

5. The method of claim 1, wherein the at least one system condition is a plurality of system conditions, and wherein the plurality of system conditions comprises an alternating current (AC) grid voltage, an AC voltage drop and a load current.

6. The method of claim 1, wherein the power converter is coupled to a rotor of a doubly fed induction generator.

7. A method for operating a wind turbine system, the method comprising:
inputting a dynamic brake condition into a controller when a dynamic brake of a wind turbine power converter is gated on;
determining when a grid fault has occurred when the dynamic brake is gated on;
reducing power generation of the wind turbine when no grid fault has occurred; and
blocking the power converter when a grid fault has occurred.

8. The method of claim 7, wherein the step of reducing power generation comprises pitching at least one rotor blade of the wind turbine.

9. The method of claim 7, wherein the wind turbine is one of a plurality of wind turbines in a wind farm, and further comprising reducing power generation in at least one other wind turbine of the plurality of wind turbines if no grid fault has occurred.

10. The method of claim 7, further comprising:
monitoring at least one of current through or temperature of at least one of a line side switch, a rotor side switch, a dynamic brake switch, or a dynamic brake resistor when the dynamic brake is gated on; and
gating off the one of the line side switch, the rotor side switch, the dynamic brake switch, or the dynamic brake resistor if the one of the current or the temperature of the one of the line side switch, the rotor side switch, the dynamic brake switch, or the dynamic brake resistor exceeds a predetermined threshold.

11. The method of claim 7, wherein the step of blocking the power converter comprises gating off at least one of a line side switch or a rotor side switch.

12. The method of claim 7, wherein the grid fault comprises at least one of an open grid islanding event, a phase jump event, a high voltage ride through event, a low voltage ride through event, or a zero voltage ride through event.

13. The method of claim 7, further comprising adjusting a threshold direct current (DC) bus voltage for the dynamic brake above a reference DC bus voltage based on at least one system condition.

14. The method of claim 13, further comprising:
gating the dynamic brake on when an experienced DC bus voltage is equal to or greater than the threshold DC bus voltage; and
gating the dynamic brake off when the experienced DC bus voltage is less than the threshold DC bus voltage.

15. The method of claim 13, wherein the at least one system condition is a plurality of system conditions, and wherein the plurality of system conditions comprises an alternating current (AC) grid voltage, an AC voltage drop and a load current.

16. A method for operating a wind turbine system, the method comprising:
monitoring a threshold direct current (DC) bus voltage for a dynamic brake in a wind turbine power converter;
adjusting the threshold DC bus voltage above a reference DC bus voltage based on at least one system condition;
gating the dynamic brake on when an experienced DC bus voltage is equal to or greater than the threshold DC bus voltage;
determining when a grid fault has occurred when the dynamic brake is gated on;
reducing power generation of the wind turbine when no grid fault has occurred; and
gating the dynamic brake off when the experienced DC bus voltage is less than the threshold DC bus voltage.

17. The method of claim 16, wherein the at least one system condition is a plurality of system conditions, and wherein the plurality of system conditions comprises an alternating current (AC) grid voltage, an AC voltage drop and a load current.

18. The method of claim 16, wherein monitoring the threshold DC bus voltage and adjusting the threshold DC bus voltage are performed in a closed loop feedback system.

19. The method of claim 16, further comprising:
inputting a dynamic brake condition into a controller when the dynamic brake is gated on.

20. The method of claim 19, further comprising:
blocking the power converter when a grid fault has occurred.

* * * * *